Jan. 3, 1956

WEN YUAN PAN 2,729,746

MULTI-CHANNEL UHF OSCILLATORS

Filed Aug. 23, 1951

2 Sheets-Sheet 1

INVENTOR
WEN YUAN PAN
BY H. W. Muston
ATTORNEY

Jan. 3, 1956 WEN YUAN PAN 2,729,746

MULTI-CHANNEL UHF OSCILLATORS

Filed Aug. 23, 1951

2 Sheets-Sheet 2

INVENTOR

WEN YUAN PAN

BY H. W. Hueston

ATTORNEY

United States Patent Office 2,729,746

Patented Jan. 3, 1956

2,729,746

MULTI-CHANNEL UHF OSCILLATORS

Wen Yuan Pan, Collingswood, N. J., assignor to Radio Corporation of America, a corporation of Delaware

Application August 23, 1951, Serial No. 243,220

The terminal fifteen years of the term of the patent to be granted has been disclaimed

15 Claims. (Cl. 250—36)

This invention relates generally to oscillation generators, and particularly relates to an oscillator which can be tuned or adjusted to two or more fixed, predetermined frequencies within the ultra high frequency (U. H. F.) spectrum.

A U. H. F. band from 470 to 890 megacycles (mc.) has been tentatively allocated for broadcasting television signals. In order to receive broadcast signals from a selected television station broadcasting within such a U. H. F. band an adapter or frequency converter may be used to beat down the received carrier wave to a lower frequency carrier wave which may be detected or demodulated by a conventional television receiver. For some purposes it may be sufficient if the U. H. F. adapter is able to receive two stations' broadcasting signals within the new U. H. F. band.

For such a U. H. F. adapter a local oscillator is required which may be tuned to two fixed, predetermined frequencies. This is most conveniently accomplished by switching pretuned circuits in the oscillator. It has been found, however, that conventional contact switches are not reliable for switching at ultra high frequencies, for example, the local oscillator circuits to develop a wave of predetermined frequency thereby to receive one of two or more desired channels. The leads necessary for connecting a contact switch to an oscillation generator have substantial inductance at ultra high frequencies. Furthermore, the actual contacts of selector switches may often introduce impedances of values which cannot be predetermined.

It is accordingly the principal object of the present invention to provide an oscillation generator which can be tuned or adjusted to oscillate at two or more different predetermined frequencies within the U. H. F. spectrum without utilizing switching means of the contact type.

A further object of the invention is to provide a frequency determining resonant circuit structure for use in a U. H. F. oscillation generator which can be tuned to a plurality of selectable resonant frequencies and wherein means are provided for adjusting independently each of the resonant frequencies of the circuit structure.

Another object of the invention is to provide a local oscillator adapted for use in a superheterodyne U. H. F. television receiver, said oscillator being adapted to develop waves having two or more predetermined frequencies, thereby to receive a desired one of a plurality of predetermined channels within the U. H. F. television range.

A. U. H. F. oscillator, in accordance with the present invention, comprises an amplifier tube having a cathode, an anode and a control grid. A frequency determining circuit or circuit structure is coupled to any two of the electrodes of the amplifier. The third electrode is connected in circuit with an impedance element such, for example, as an inductor. The frequency determining circuit of the oscillator includes at least one inductance element which may, for example, consist of a conductor representing inductance. The frequency determining circuit further includes three high frequency capacitance means. The high frequency inductance element is connected in series with the first and the second capacitance means while the third capacitance means is connected in parallel with the second capacitance means.

Means are provided for selectively adjusting the capacitance of the second capacitance means to a first relatively large value and to a second relatively small value. Thus, by way of example, the second capacitance means may consist of a tube of a material having a high dielectric constant. The tube is provided on its outside with two spaced conductive or metallic coatings. A metallic channel selecting core is disposed within the tube and may be moved to a first position where it is adjacent to both of the associated coatings and to a second position where it is adjacent to one of the coatings only. In the first position of the channel selecting core the capacitance of the second capacitance means is large and in the second position of the core its capacitance is small.

Consequently, the lower one of the resonant frequencies of the frequency determining circuit is determined by the inductance of the inductance element, the capacitance of the first capacitance means and the relatively large capacitance of the second capacitance means. This latter capacitance has a smaller reactance than that of the third capacitance means which accordingly forms no part of the resonant circuit. The higher one of the resonant frequencies of the frequency determining circuit is obtained when the channel selecting core is in its second position and is determined by the inductance of the inductance element and the capacitance of the first and third capacitance means. The relatively small capacitance of the second capacitance means represents a larger reactance than that of the third capacitance means so that the capacitance of the second capacitance means forms no part of the resonant circuit. Preferably the first and third capacitance means is adjustable to adjust the two resonant frequencies of the oscillator. Hence the oscillator may be designed to develop an intermediate frequency wave with two selected channels with the U. H. F. band.

It is also feasible to provide a frequency determining circuit having three or more different predetermined resonant frequencies so that the oscillator may be tuned to a plurality of resonant frequencies.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
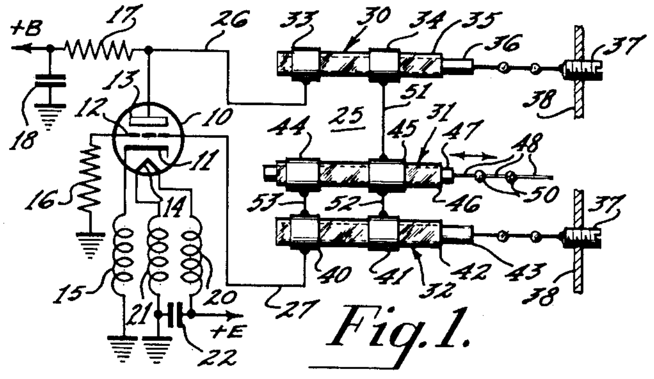
Figure 1 is a circuit diagram of an oscillation generator including a frequency determining circuit structure tunable to two different fixed frequencies and embodying the present invention.

Referring now to the drawing wherein like elements are designated by the same reference characters throughout the figures, and particularly to Figure 1, there is illustrated an oscillation generator tunable or adjustable to two predetermined fixed frequencies. The oscillation generator of Figure 1 comprises an amplifier tube 10 such as a triode as shown having a cathode 11, a control grid 12 and an anode 13. The cathode 11 is indirectly heated by a filament 14. The amplifier tube 10 may, for example, be of the 6AF4 type.

The cathode 11 is grounded through an inductor 15 and the grid 12 through grid leak resistor 16. The anode 13 is connected to a suitable anode voltage supply indicated at +B through dropping resistor 17 which is bypassed to ground through bypass capacitor 18. The filament 14 is connected to a source of filament voltage indicated at +E through inductors 20 and 21. Inductor 21 is grounded as shown and both inductors may be bypassed through bypass capacitor 22.

In accordance with the present invention, a frequency determining circuit structure 25 is connected to two of the electrodes of amplifier tube 10. As will be explained more in detail hereinafter in connection with Figures 5 and 6, the frequency determining circuit structure 25 may be coupled to any two of the electrodes of amplifier tube 10. As illustrated in Figure 1, the circuit structure 25 is connected by conductors or leads 26 and 27 to anode 13 and control grid 12 respectively. The conductors 26 and 27 represent inductance at ultra-high frequencies and may, of course, be replaced by any other conventional inductance element. The frequency determining circuit 25 further includes a first capacitance means 30, a second capacitance means 31 and a third capacitance means 32. The capacitance means 30 and 32 may be adjustable while the capacitance means 31 selects a channel and may be adjusted to a first position where its capacitance is relatively large and to a second position where its capacitance is relatively small.

As will be explained more in detail hereinafter in connection with Figures 5 and 6 the capacitance means 30 and 32 may consist, for example, of adjustable trimmer capacitors. Preferably, however, as illustrated in Figure 1 the capacitance means 30 includes two conductive capacitance members 33 and 34 which may, for example, be in the form of metallic coatings on the outer surface of a tube 35 of a material having a high dielectric constant, such as glass or ceramic. The capacitance members or coatings 33, 34 cooperate with a conductive core 36 which may consist of metal such as brass. Thus, a capacitance is formed between coating 33 and core 36 and between core 36 and coating 34. The core 36 may be adjusted with respect to the coating 33 by a screw 37 connected to core 36 and extending through a threaded opening in a fixed plate 38.

The capacitance means 32 may be identical with capacitance means 30 and includes a pair of metallic coatings 40, 41 provided on the dielectric tube 42 within which the conductive core 43 is provided. Again the position of core 43 may be adjusted by a screw 37 extending through a plate 38.

The capacitance means 31 also consists of a pair of conductive coatings 44 and 45 provided on the dielectric tube 46 within which a channel selecting core 47 is arranged. The core 47 may be moved to a first position as shown in Figure 1 where the core extends within both coatings 44 and 45 into a second position where the core 46 is entirely removed from the coating 44 but extends within the coating 45 only. The core 47 is movable by wires 48 which may be interconnected through glass beads 50.

A conductor 51 which represents inductance to U. H. F. currents interconnects the coatings 34 and 45. Further conductors 52 and 53 interconnect respectively the coatings 45, 41 and the coatings 44, 40. Conductors 52 and 53 preferably are very short so as to have negligible inductance.

Figure 2:
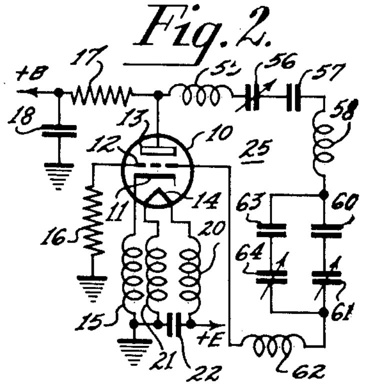
Figure 2 is an equivalent circuit diagram of the oscillator of Figure 1.

The operation of the oscillation generator of Figure 1 will be better understood by reference to Figure 2 illustrating an equivalent circuit diagram of the oscillator. As shown in Figure 2 the frequency determining network or structure 25 consists of an inductor 55, a first pair of capacitors 56 and 57, an inductor 58, a second pair of capacitors 60, 61 and an inductor 62 connected in series between anode 13 and control grid 12. A third pair of capacitors 63 and 64 is connected in parallel with capacitors 60, 61.

The inductors 55, 58 and 62 represent respectively the inductance of leads 26, 51 and 27. The capacitors 56 and 57 indicate the capacitance between coating 33 and core 36 and between core 36 and coating 34 respectively. Since the core 36 is adjustable with respect to the coating 33, capacitor 56 has been indicated as being adjustable. Capacitors 60 and 61 indicate respectively the capacitance between the coating 45 and core 47 and between coating 44 and core 47. Capacitor 61 has been indicated to be variable because core 47, which is the channel selecting core, may be moved out of engagement with the coating 44. Finally, capacitors 63 and 64 indicate respectively the capacitance between coating 41 and core 43 and between coating 40 and core 43, the latter being adjustable. It will be seen that the capacitance means 32 (capacitors 63, 64) is effectively connected in parallel with the capacitance means 31 (capacitors 60, 61).

The operation of the oscillation generator will first be described with the channel selecting core 47 in the position shown in Figure 1; in that case, the core 47 is disposed adjacent to both coatings 44, 45. The capacitance of capacitors 60, 61 is relatively large so that the two capacitors represent a reactance that is small compared with that of the capacitors 63, 64. The resonant frequency of the frequency determining circuit 25 is accordingly determined by the inductance of inductors 55, 58 and 62 and by the capacitance of capacitors 56, 57 and 60, 61. In view of the relatively large reactance of capacitors 63, 64 they practically form no part of the resonant circuit. The oscillation generator now resonates at the resonant frequency of the circuit structure 25 connected between anode 13 and grid 12. This resonant frequency is the lower one of the two resonant frequencies of the circuit structure 25. The resonant frequency may be adjusted by the adjustment of the core 36, that is, of the capacitor 56. By way of example, the oscillation generator of Figure 1 may be adjusted to receive the U. H. F. television channel No. 17.

When the channel selecting core 47 is moved into its second position, that is, out of engagement with the coating 44, the capacitance of capacitance means 31 (capacitors 60, 61) is relatively small. Consequently, the reactance of capacitors 60, 61 is relatively large compared to that of capacitors 63, 64. The resonant frequency of the frequency determining circuit 25 is now determined by the inductance of inductors 55, 58 and 62 and by the capacitance of capacitors 56, 57 and 63, 64. In view of their large reactance capacitors 60, 61 practically form no part of the resonant circuit.

The oscillator now oscillates at the higher one of its two resonant frequencies. This frequency may be adjusted by an adjustment of core 43, that is, of capacitor 64. The oscilaltor may be adjusted to receive, for example, a signal on channel No. 33. By way of example, the capacitance of capacitors 56, 57 or that of capacitors 63, 64 may be adjusted between a minimum value of 1.0 micromicrofarads and 5.0 micromicrofarads. The capacitance of capacitors 60, 61 is selectively adjustable between a large value of 10 micromicrofarads and a small value of 0.5 micromicrofarad. The high resonant frequency and the low resonant frequency of the oscillator may thus be adjusted independently within a range of two to one. Thus, the oscillator may be adjusted at the factory or by a service man to receive two selected channels each channel being selectable within a range of two to one.

Figure 3:
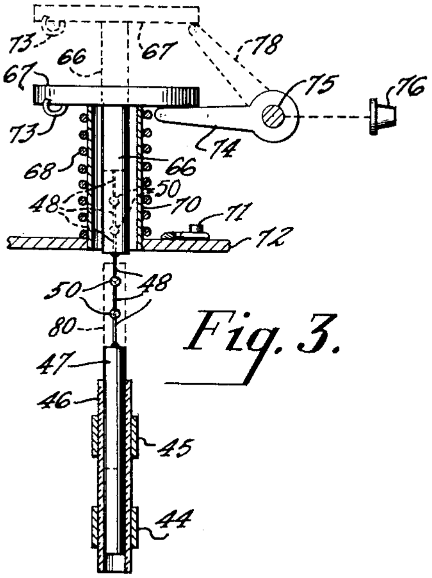
Figure 3 is an elevational view, with parts broken away, of the mechanism for switching the oscillator of Figure 1 to receive selectively one of two predetermined channels.
Figure 4:
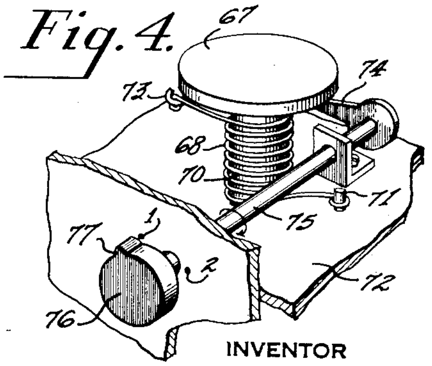
Figure 4 is a view in perspective of the channel switching mechanism of Figure 3.

Referring now to Figures 3 and 4 there is illustrated, by way of example, a mechanism for moving the channel selecting core 47 into its two predetermined positions. The core 47 is secured by means of the wires or leads 48 to a stem 66 integral with or secured to a disc 67. The disc 67 is normally urged downwards by a spring 68 disposed about a fixed sleeve 70 and having its ends secured to a pin 71 on a fixed plate 72 and to a hook 73 on the disc 67.

The disc 67 is raised or lowered by a lever 74 secured to a shaft 75 which is actuated by a control knob 76. Accordingly, when the control knob 76 is turned in a clockwise direction from a position 1 indicated by pointer 77 into position 2, the lever 74 moves into position 78 shown in dotted lines. Consequently, the disc 67 is lifted against the action of spring 68 and the channel selecting core 77 is moved into the dotted position 80 so that its lower edge is out of engagement with the coating 44.

It has been found that this mechanism gives a mechanical resetting accuracy of $\frac{1}{64}$ of an inch or better. It has been found that a resetting error of this magnitude, the oscillator frequency at 650 mc. varies by no more than 20 kilocycles (kc.) which can easily be corrected by the fine tuning of the receiver.

Figure 5:
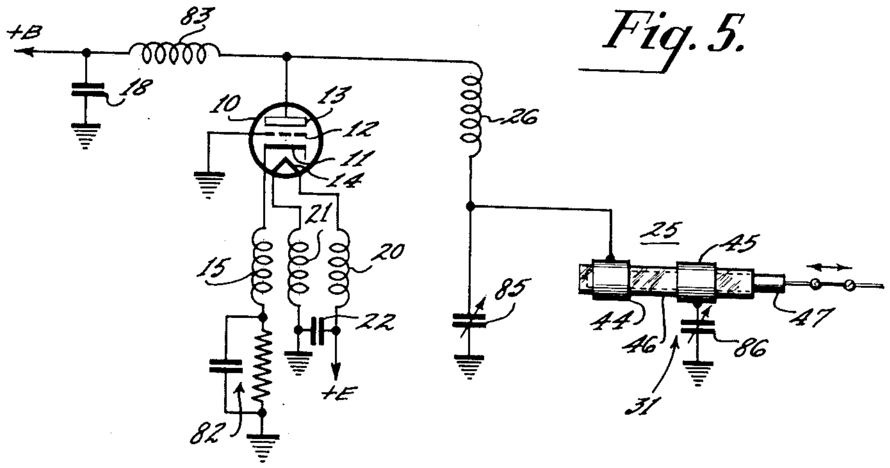
Figures 5 and 6 are circuit diagrams of two oscillation generators in accordance with the present invention illustrating modifications of the oscillator of Figure 1.

Referring now to Figure 5 there is illustrated a modification of the oscillation generator of the invention which is also adapted to be tuned to two fixed predetermined frequencies. The amplifier tube 10 has its control grid 12 grounded. The cathode 11 is grounded through inductor 15 and bias network 82 connected in series. The anode 13 may be connected to +B through inductor 83 arranged as a choke. The choke 83 may be bypassed to ground by bypass capacitor 18. The frequency determining network 25 is connected between the anode 13 and ground, that is, between the anode 13 and the grounded grid 12.

The frequency determining network 25 includes an inductor 26 which may consist of a conductor as shown in Figure 1. Inductor 26 is connected in series with adjustable capacitor 85 between the anode 13 and ground. The junction point between inductor 26 and capacitor 85 is connected to the coating 44 of the capacitance means 31 which may be identical with that illustrated in Figure 1. The coating 45 is connected to ground through adjustable capacitor 86. Accordingly, capacitor 85 is connected in parallel with capacitance means and capacitor 86.

The operation of the oscillation generator of Figure 5 is similar to that of Figure 1. When the channel selecting core 47 is in the first position, that is, adjacent to both coatings 44 and 45, the oscillator oscillates at its lower resonant frequency. The oscillatory wave energy flows from anode 13 through inductor 26, coating 44, core 47, coating 45 and capacitor 86 through ground to grid 12. Since the capacitance of the capacitance means 31 is large, its reactance is small compared to that of the capacitor 85.

When the channel selecting core 47 is in its second position adjacent to coating 45 only, the capacitance means 31 and capacitor 86 are effectively disconnected from the resonant circuit. Accordingly, the resonant circuit includes inductor 26 and capacitor 85 and the oscillator oscillates at the higher one of its resonant frequencies. Adjustment of the capacitors 86 and 85 will respectively adjust the lower and the higher resonant frequency of the oscillator.

It is also feasible to connect the resonant circuit 25 to the control grid 12 which should be grounded through a grid leak resistor. In that case, the anode 13 should be bypassed to ground for the oscillatory currents by a capacitor. Consequently, the frequency determining circuit 25 is again effectively connected between the control grid 12 and anode 13.

Figure 6:
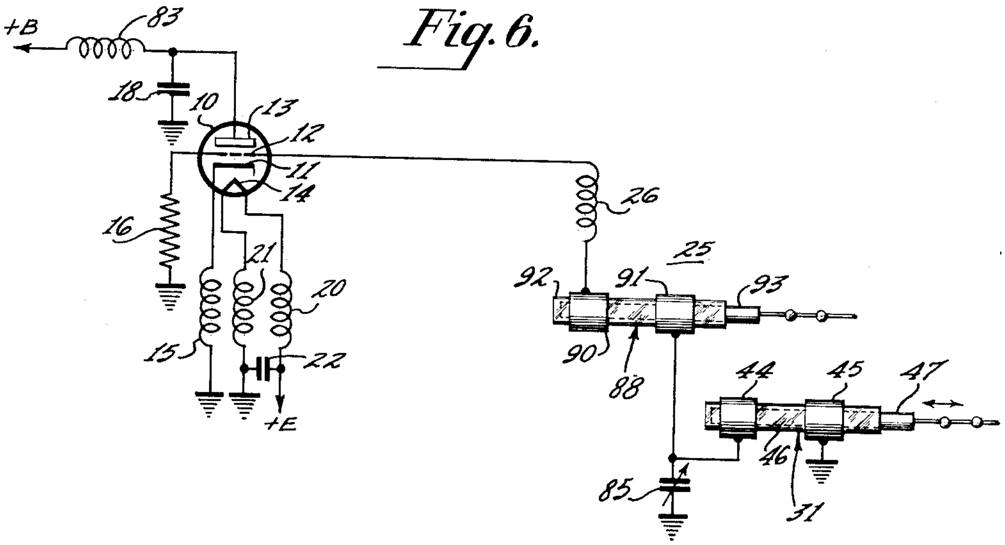

An oscillation generator of this type has been illustrated in Figure 6 to which reference is now made. The amplifier tube 10 has its control grid 12 grounded through leak resistor 16. The anode 13 is connected to +B through inductor 83. The anode 13 is directly bypassed to ground by capacitor 18 so that the anode is at ground potential for the oscillatory currents.

The frequency determining resonant network 25 is now connected between the control grid 12 and ground. The frequency determining network 25 again includes an inductor 26, capacitance means 88 and capacitor 85 connected in series between control grid 12 and ground. Capacitance means 88 may consist of an adjustable trimmer capacitor. However, in view of the fact that none of its terminals are grounded, it is preferred to utilize a capacitance means consisting of two conductive coatings 90, 91 provided on a dielectric tube 92 having a conductive core 93. The coating 90 is connected to inductor 26 while the coating 91 is connected to ground through capacitor 85. The junction point between coating 91 and capacitor 85 is connected to coating 44 of capacitance means 31, while its other coating 45 is grounded.

With the channel selecting core 47 in its first position adjacent to both coatings 44 and 45 the oscillation generator resonates at the lower one of its resonant frequencies. The resonant circuit 25 includes inductor 26, capacitance means 88 and capacitance means 31 connected in series. Since the reactance of capacitor 85 is high compared to that of the capacitance means 31, it forms no part of the resonant circuit.

When the channel selecting core 47 is in its second position adjacent to the coating 45 only, the oscillator resonates at the higher one of its resonant frequencies. The resonant circuit 25 now includes inductor 26, capacitance means 88 and capacitor 85. The capacitance means 88 and the capacitor 85 adjust respectively the lower and the higher one of the resonant frequencies in the manner previously explained. Capacitance means 88 is adjusted by moving its core 93 with respect to coating 90.

A frequency determining circuit 25 as shown in Figure 6 may, of course, be connected in the manner illustrated in Figure 5 to the anode 13 rather than to the control grid 12.

Figure 7:
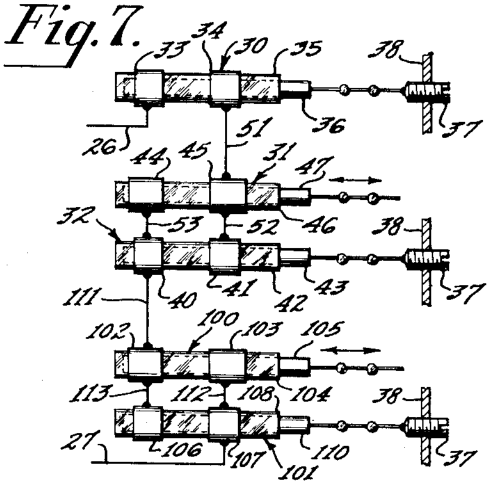
Figure 7 is a schematic diagram of a series resonant circuit structure tunable to three different predetermined frequencies in accordance with the present invention.

Referring now to Figure 7 there is illustrated a frequency determining circuit which is tunable to three different fixed frequencies. The frequency determining circuit or circuit structure of Figure 7 may, for example, be connected in the oscillator of Figure 1. The frequency determining circuit structure of Figure 7 includes the capacitance means 30, 31 and 32 which may be identical with those illustrated in Figure 1. The frequency determining network further includes capacitance means 100 and 101. The capacitance means 100 comprises a pair of conductive coatings 102, 103 provided on the tube 104, within which a metallic core 105 is movable. The core 105 is also a channel selecting core. The capacitance means 101 includes the coatings 106 and 107 provided on the tube 108 within which a metallic core 110 is provided.

The core 110 is adjustable as are the cores 36 and 43 in the manner previously described. The capacitance means 30, 31 and 32 are connected in the manner illustrated in Figure 1. A conductor 111 which represents inductance connects the coatings 40 and 102. Conductors 112 and 113 which are so short as to have negligible inductance interconnect respectively the coatings 103 and 107 and the coatings 102 and 106. A pair of output leads 26 and 27 is connected respectively to the coatings 33 and 107. These output leads 26, 27 may be connected respectively to the anode 13 and the control grid 12 of an oscillator as shown in Figure 1.

Figure 8:
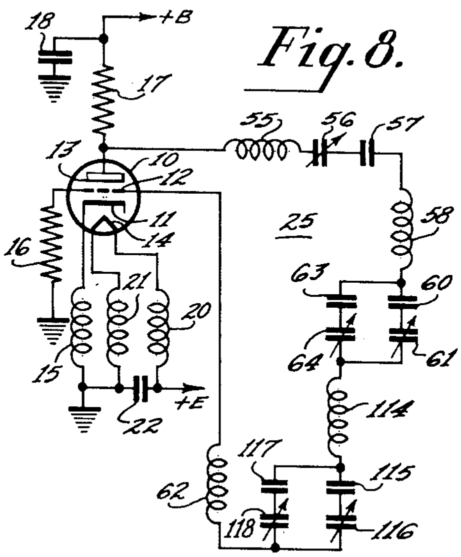
Figure 8 is an equivalent circuit diagram of an oscillation generator embodying the circuit structure of Figure 7.

Referring now to Figure 8 there is illustrated an equivalent circuit of an oscillation generator of the type illustrated in Figure 1 utilizing the frequency determining network 25 of Figure 7. The frequency determining circuit 25 includes inductor 55, a pair of capacitors 56, 57, inductor 58, a pair of capacitors 60, 61, inductor 114, a pair of capacitors 115, 116 and inductor 62 connected in series between anode 13 and grid 12. Capacitors 63, 64 are connected in parallel with capacitors 60, 61. Furthermore, a pair of capacitors 117, 118 is connected in parallel with capacitors 115, 116.

The inductors 55, 58 and 62 and the capacitors 56, 57 and 60 to 64 correspond to those shown in Figure 2. The inductor 114 represents the inductance of lead 111. The capacitors 115, 116 indicate the capacitance between coating 103 and core 105 and between coating 102 and core 105 respectively. Similarly, the capacitors 117 and 118 indicate the capacitance between coating 107 and core 110 and between coating 106 and core 110.

The operation of the oscillation generator of Figure 8 is similar to that illustrated in Figures 1 and 2. If both channel selecting cores 47 and 105 are in their first position, that is adjacent to both their coatings, the frequency determining circuit 25 is resonant at the lowest one of its resonant frequencies. Its resonant frequency is determined by the inductance of inductors 55, 58, 114 and 62 and by the capacitance of capacitors 56, 57, 60, 61 and 115, 116. The lowest of the resonant frequencies may be adjusted by an adjustment of capacitor 56 to receive, for example, U. H. F. television channel No. 17.

Let it be assumed now that channel selecting core 105 remains in its previous position while channel selecting core 47 is moved into its second position adjacent to its coating 45 only. In that case, the frequency determining circuit 25 resonates at the intermediate one of its resonant frequencies. This resonant frequency is determined by the inductance of inductors 55, 58, 114 and 62 and the capacitance of capacitors 56, 57, 63, 64 and 115, 116. The resonant frequency may now be adjusted by adjusting the capacitance of capacitor 64. The oscillation generator may thus be adjusted to receive, for example, U. H. F. television channel No. 29.

Finally, if both channel selecting cores 47 are in their second position adjacent to one of their associated coatings only, the frequency determining circuit 25 will resonate at the highest one of its resonant frequencies. This resonant frequency is determined by the inductance of inductors 55, 58, 114 and 62 and by the capacitance of capacitors 56, 57, 63, 64 and 117, 118. This resonant frequency may be adjusted by an adjustment of the capacitance of capacitor 118. The oscillation generator may thus be adjusted to receive, for example, U. H. F. television channel No. 38. It will be understood that oscillation generators selectably tunable to more than three channels may readily be provided in accordance with the present invention.

There has thus been disclosed an oscillation generator which may be adjusted or tuned to two or more predetermined fixed frequencies. This is effected without utilizing a contact switch by simply varying the capacitance of a special capacitance means from a relatively large value to a relatively small value. It has been found that the over all warm-up drift of the oscillation generator of the invention is no more than 50 kc.

What is claimed is:

1. In a U. H. F. oscillator adapted to be tuned to two predetermined fixed frequencies, a frequency-determining series-resonant circuit structure comprising a first, a second and a third capacitance means, said first capacitance means including a first and a second capacitance member spaced from each other and a first conductive core disposed adjacent to said first and second members and adjustable with respect to said first member, said second capacitance means including a third and a fourth capacitance member spaced from each other and a second conductive core movable to a first position adjacent to both said third and fourth members and to a second position adjacent to said fourth member only, said third capacitance means including a fifth and a sixth capacitance member spaced from each other and a third conductive core disposed adjacent to said fifth and sixth members and adjustable with respect to said fifth member, a first conductor connecting said second member to said fourth member and providing inductance, further conductors providing negligible inductance and connecting said fourth to said sixth member and said third to said fifth member, and two output conductors connected individually to said first and to said fifth member.

2. In a U. H. F. oscillator adapted to be tuned to two predetermined fixed frequencies, a frequency-determining series-resonant circuit structure comprising a first, a second and a third capacitance means, each of said capacitance means including a tube of a material having a high dielectric constant, a first and a second conductive coating provided on the outer surface of each of said tubes and spaced from each other, and a conductive core disposed within each of said tubes and adjustable with respect to said coatings, a first conductor connecting the second coatings of said first and second capacitance means and providing inductance, further conductors providing negligible inductance and connecting the second coatings of said second and third capacitance means and connecting the first coatings of said second and third capacitance means, and two output conductors providing inductance and connected individually to the first coatings of said first and third capacitance means.

3. A circuit structure as defined in claim 2 wherein means is provided for adjusting the core of said second capacitance means to a first position adjacent to both of its associated coatings and to a second position adjacent to one of its associated coatings only, whereby said second capacitance means provides a relatively large capacitance with said core in its first position and a relatively small capacitance with said core in its second position.

4. A circuit structure as defined in claim 2 wherein means is provided for adjusting independently the position of the core of said first and of said third capacitance means with respect to one of its associated coatings.

5. A U. H. F. oscillator adapted to be tuned to three predetermined fixed frequencies within the U. H. F. spectrum comprising an amplifier tube having three electrodes including a control electrode, a frequency determining circuit coupled to two of said electrodes, and an impedance element connected in circuit with the third one of said electrodes; said frequency determining circuit including at least one inductance element, a first, a second, a third, a fourth and a fifth capacitance means, said inductance element being connected in series with said first, said second and said fourth capacitance means, said third capacitance means being connected in parallel with said second capacitance means, said fifth capacitance means being connected in parallel with said fourth capacitance means, and means for selectively and independently adjusting the capacitance of said second capacitance means and that of said fourth capacitance means to a first relatively large value and to a second relatively small value, whereby said frequency determining circuit provides three resonant frequencies, one of said resonant frequencies being determined by the inductance of said inductance element, the capacitance of said first capacitance means and the relatively large capacitances of said second and of said fourth capacitance means, a second one of said frequencies being determined by said inductance, the capacitance of said first and third capacitance means and the relatively large capacitance of said fourth capacitance means, and the third one of said frequencies being determined by said inductance and the capacitance of said first, said third and said fifth capacitance means.

6. A frequency determining circuit as defined in claim 5 wherein means is provided for adjusting independently the capacitance of said first, third and fifth capacitance means.

7. In a U. H. F. oscillator adapted to be tuned to three predetermined fixed frequencies, a frequency-determining series-resonant circuit structure comprising a first, a second, a third, a fourth and a fifth capacitance means, said first, said third and said fifth capacitance means including each a first and a second capacitance member spaced from each other and a first conductive core disposed adjacent to said first and second members, said second and fourth capacitance means including each a third and a fourth capacitance member spaced from each other and a second conductive core movable to a first position adjacent to both said third and fourth members and to a second position adjacent to said fourth member only, a first conductor connecting the second member of said first capacitance means to the fourth member of said second capacitance means, a second conductor connecting the first member of said third capacitance means to the third member of said fourth capacitance means, further conductors connecting individually the fourth member of said second capacitance means to the second member of said third capacitance means, the third member of said second capacitance means to the first member of said third capacitance means, the fourth member of said fourth capacitance means to the second member of said fifth capacitance means and the third member of said fourth capacitance means to the first member of said fifth capacitance means, and two output conductors connected individually to the first member of said first capacitance means and to the second member of said fifth capacitance means.

8. In a U. H. F. oscillator adapted to be tuned to three predetermined fixed frequencies, a frequency-determining series-resonant circuit structure comprising a first, a second, a third, a fourth and a fifth capacitance means, said first, said third and said fifth capacitance means including each a first and a second capacitance member spaced from each other and a first conductive core disposed adjacent to said first and second members and adjustable with respect to said first member, said second and fourth capacitance means including each a third and a fourth capacitance member spaced from each other and a second conductive core movable to a first position adjacent to both said third and fourth members and to a second position adjacent to said fourth member only, a first conductor providing inductance and connecting the second member of said first capacitance means to the fourth member of said second capacitance means, a second conductor providing inductance and connecting the first member of said third capacitance means to the third member of said fourth capacitance means, further conductors providing negligible inductance and connecting individually the fourth member of said second capacitance means to the second member of said third capacitance means, the third member of said second capacitance means to the first member of said third capacitance means, the fourth member of said fourth capacitance means to the second member of said fifth capacitance means and the third member of said fourth capacitance means to the first member of said fifth capacitance means, and two output conductors providing inductance and connected individually to the first member of said first capacitance means and to the second member of said fifth capacitance means.

9. A frequency-determining series-resonant circuit structure comprising a first, a second, a third, a fourth and a fifth capacitance means, each of said capacitance means including a tube of a material having a high dielectric constant, a first and a second conductive coating provided on the outer surface of each of said tubes and spaced from each other, and a conductive core disposed within each of said tubes, a first conductor providing inductance and interconnecting the second coatings of said first and second capacitance means, a second conductor providing inductance and interconnecting the first coatings of said third and fourth capacitance means, further conductors providing negligible conductance and interconnecting the first coatings of said second and third capacitance means, the second coatings of said second and third capacitance means, the first coatings of said fourth and fifth capacitance means and the second coatings of said fourth and fifth capacitance means, and two output conductors providing inductance and connected individually to the first coating of said first capacitance means and to the second coating of said fifth capacitance means.

10. A circuit structure as defined in claim 9 wherein means is provided for adjusting the core of said second capacitance means of said fourth capacitance means independently to a first position adjacent to both of its associated coatings and to a second position adjacent to one of its associated coatings only, whereby said second capacitance means and said fourth capacitance means provide a relatively large capacitance with said core in its first position and a relatively small capacitance with said core in its second position.

11. In a U. H. F. oscillator adapted to be tuned to predetermined fixed frequencies, a frequency-determining series-resonant circuit structure comprising at least one inductance element, a first, a second and a third capacitance means, said second capacitance means including a first and a second capacitance member spaced from each other and a conductive core movable to a first position adjacent to both said members and to a second position adjacent to one of said members only, said inductance element being connected in series with said first and said second capacitance means, said third capacitance means being connected in parallel with at least one of said first and second capacitance means.

12. A circuit structure as defined in claim 11 wherein said third capacitance means is connected in parallel with both said first and said second capacitance means and wherein said first and said third capacitance means are adjustable.

13. A circuit structure as defined in claim 11 wherein said third capacitance means is connected in parallel with said second capacitance means only and wherein said first and said third capacitance means are adjustable.

14. In a U. H. F. oscillator adapted to be tuned to two predetermined fixed frequencies, a frequency determining circuit structure comprising a first, a second and a third capacitance means, said first capacitance means including a first and a second capacitance member spaced from each other and a first conductive core disposed adjacent to said first and second members, said second capacitance means including a third and a fourth capacitance member spaced from each other and a second conductive core movable to a first position adjacent to both said third and fourth members and to a second position adjacent to said fourth member only, a first conductor interconnecting said second to said third member and connecting both of said members to one terminal of said third capacitance means, a second conductor providing inductance connected to said first member, and a third conductor connected to both said fourth member and to the other terminal of said third capacitance means.

15. A circuit structure as defined in claim 14 wherein said third capacitance means is adjustable and wherein said first core is adjustable with respect to said first member.

References Cited in the file of this patent

UNITED STATES PATENTS

| | | |
|---|---|---|
| 1,641,438 | Jones | Sept. 6, 1927 |
| 1,641,635 | Klein | Sept. 6, 1927 |
| 2,137,435 | Yolles | Nov. 22, 1938 |
| 2,261,879 | Higgins | Nov. 4, 1941 |
| 2,278,066 | Domack et al. | Mar. 31, 1942 |
| 2,503,084 | White et al. | Apr. 4, 1950 |
| 2,562,263 | Ehrlich | July 31, 1951 |
| 2,589,092 | Kihn | Mar. 11, 1952 |
| 2,626,354 | Cheek | Jan. 20, 1953 |

FOREIGN PATENTS

| | | |
|---|---|---|
| 541,712 | Great Britain | Dec. 8, 1941 |